A. L. FENTON.
DOUGH RAISER.
APPLICATION FILED JULY 26, 1910.
1,026,978.
Patented May 21, 1912.
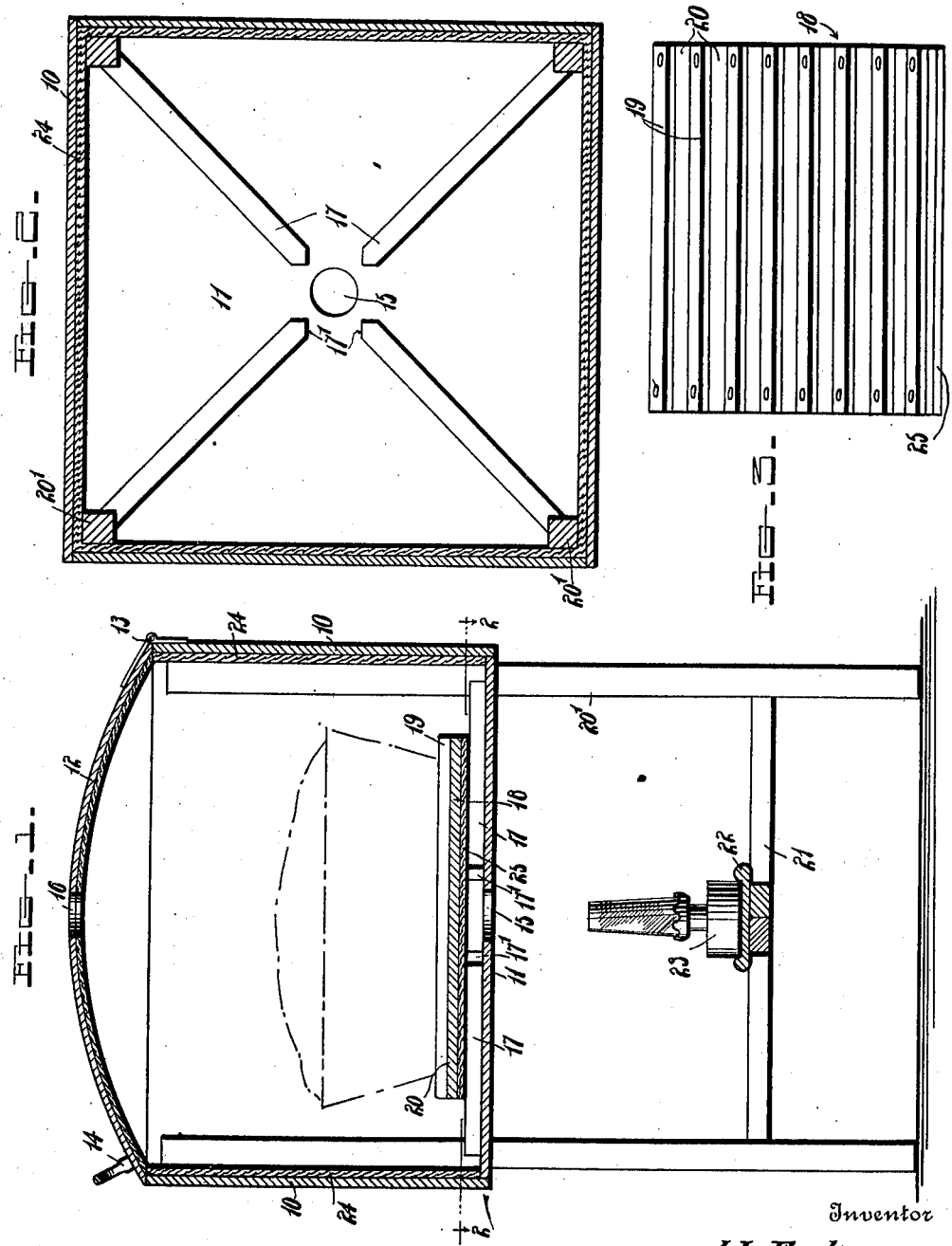

UNITED STATES PATENT OFFICE.

ARTHELLO L. FENTON, OF RICHFIELD, NEW YORK.

DOUGH-RAISER.

1,026,978.      Specification of Letters Patent.      Patented May 21, 1912.

Application filed July 26, 1910. Serial No. 573,855.

*To all whom it may concern:*

Be it known that I, ARTHELLO L. FENTON, a citizen of the United States, residing at Richfield, in the county of Otsego, State of New York, have invented certain new and useful Improvements in Dough-Raisers; and I do hereby declare the following to be a full, clear, and exact description of the invention, such as will enable others skilled in the art to which it appertains to make and use the same.

This invention relates to culinary apparatus and has special reference to a device for raising dough preparatory to baking.

One object of the invention is to improve and simplify the general construction of devices of this character.

A second object of the invention is to provide a device of this character having a novel arrangement of baffles so constructed as to improve the distribution of heat.

With the above and other objects in view the invention consists in general of a casing provided with a novel interior arrangement and means to support the casing and hold the lamp positioned thereunder.

The invention further consists in certain novel details of construction and combinations of parts hereinafter fully described illustrated in the accompanying drawings, and specifically set forth in the claim.

In the accompanying drawings, like characters of reference indicate like parts in the several views, and;

Figure 1 is a longitudinal sectional view through a dough raiser constructed in accordance with my invention. Fig. 2 is a cross sectional view through the dough raiser, taken on the line 2—2 Fig. 1. Fig. 3 is a detail perspective view of the false bottom used in connection with the invention.

The invention comprises a casing having side walls 10, a bottom 11 and a cover 12. This cover has one edge hinged to one of the side walls as at 13 and on the other edge of the cover is provided a handle 14. Furthermore, the cover is segmento cylindrical in form as can be clearly seen from the reference to Fig. 3. In the bottom 11 is provided an opening 15 while the cover 12 is likewise provided with an opening 16 immediately above the opening 15, both of these openings being centrally disposed. The casing is rectangular in plan and the bottom 11 is provided with ribs 17 which radiate from the opening 15, the ends of the ribs being pointed and spaced slightly from said opening while the outer ends terminate in the corners of the casing. By virtue of the pointed ends of the ribs, deflecting surfaces 17' are formed which deflect the heat rising through the opening 15 in the bottom, in all directions along the bottom face of a false bottom which will now be described.

On the ribs 17 is held a false bottom 18 provided with transversely extending ribs 19 spaced apart to form channels 20 and extending from one side to the other of said bottom. Extending upward into the casing and projecting downward below the bottom are the legs 20' which are connected adjacent the bottom by diagonal members 21 forming a lamp stand and carrying a lamp holder 22 wherein is normally held a lamp 23 of the type common in incubators. The casing is provided with an asbestos lining 24 and the under side of the false bottom 18 is likewise provided with an asbestos sheathing 25.

In the operation of this device the pan containing the dough is placed in the casing as shown in dotted lines in Fig. 3 and the lamp lighted. A thermometer is placed between two of the ribs 19 prior to putting the bread pan in position and the height of the wick so regulated that the temperature indicated by the thermometer is between 70° and 80° F. After the bread is inserted the thermometer may be stood in a corner and watched from time to time to keep the temperature the same.

There has thus been provided a simple and efficient device of the kind described and for the purpose specified.

Having thus described the invention, what is claimed as new, is:

A dough raiser including a casing having an approximately centrally disposed opening in the bottom, a plurality of radial ribs integral with the top face of the bottom and extending from the borders thereof to nearly the central opening of the bottom, the confronting inner ends of the ribs being pointed and forming deflector surfaces, a pan rack supported by said ribs, and a heater disposed beneath the opening in the bottom and arranged to discharge its heat therethrough against said rack.

In testimony whereof, I affix my signature, in presence of two witnesses.

ARTHELLO L. FENTON.

Witnesses:
EVERETT A. CLARKE,
JAMES PATTERSON.

Copies of this patent may be obtained for five cents each, by addressing the "Commissioner of Patents, Washington, D. C."